Jan. 25, 1927.
J. McKENZIE
1,615,469
TIRE MOUNTING AND DEMOUNTING MACHINE
Filed Sept. 22, 1925
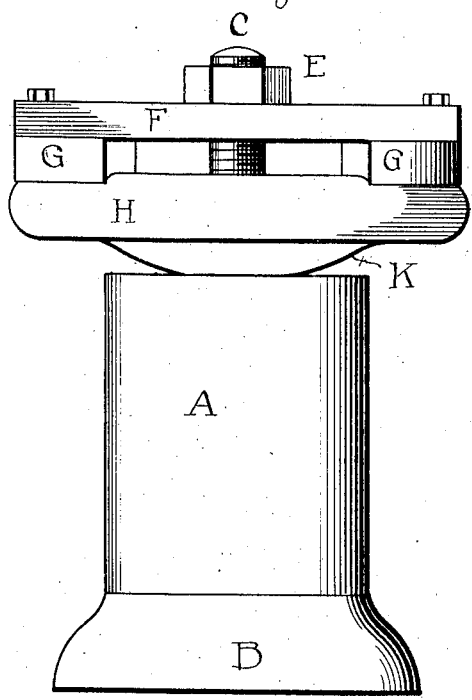
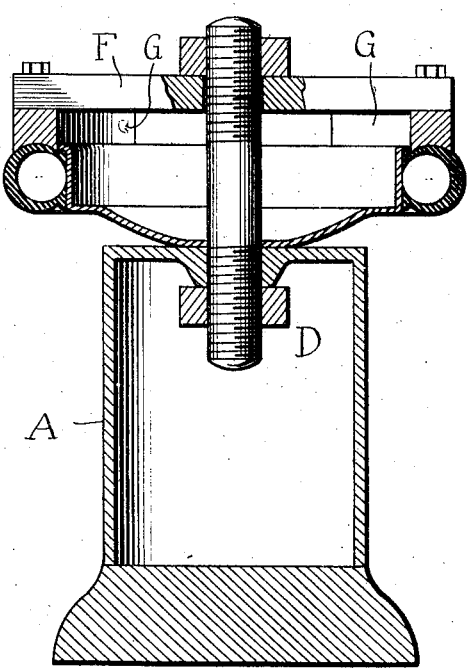
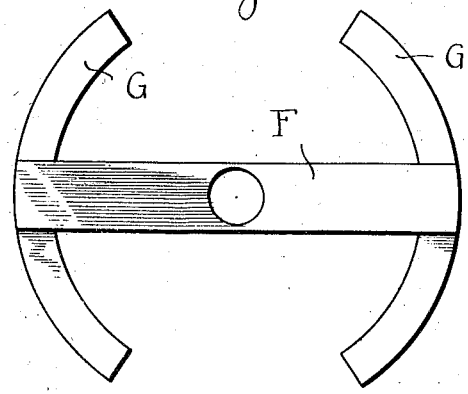
John McKenzie,
Inventor Patented Jan. 25, 1927.

1,615,469

UNITED STATES PATENT OFFICE.

JOHN McKENZIE, OF QUINCY, MASSACHUSETTS.

TIRE MOUNTING AND DEMOUNTING MACHINE.

Application filed September 22, 1925. Serial No. 57,949.

My invention comprises a means for mounting and demounting tires on wheels for automobiles and is specially applicable to the heavier solid or disc wheels such as are used on automobile trucks and buses.

Ordinarily the mounting and demounting of tires, especially the heavier sizes involves several hours of laborious, dirty work but by the use of my invention the heavy labor is practically eliminated and the work on any one tire may be accomplished in a few minutes; this is a great economy when it is applied to the many such operations that take place in any garage or repair shop every day.

For a full understanding of my invention reference may be made to the accompanying drawings and specifications where the details of construction and operation are fully set forth.

In the accompanying drawings Figure 1 is a front elevation of the assembled device; Figure 2 is a vertical section through the centre line of Figure 1; Figure 3 is a plan view of the cross bar device carrying a pressure shoe on each end; identical parts in each figure are designated by the same letter.

Referring now to the figures in detail, A is a ruggedly built pedestal made of either wood or metal and having its base B extended and specially weighted; C is a rugged stud bolt set into the top of A and secured in an immovable condition by the lock nut D; E is a threaded pressure nut adapted to travel up or down on the stud bolt C; F is a strong cross bar made of either wood or metal and having a hole through its centre to clear the stud bolt C; G G are curved shoes bolted to F and having their bearing faces curved to suit the contour of the tire; H is the pneumatic tire in position and mounted upon the solid disc wheel K.

It will be apparent to any one familiar with the art from an inspection of these figures just how the device is used; it will be observed that Figures 1 and 2 show a vehicle wheel placed in such a position that if pressure is brought to bear upon the cross bar F by the application of a common wrench to the pressure nut E, the tire H will be forced downward off the wheel K. It will be noted that just a few turns of the wrench will serve to demount the tire.

On the other hand if it is desired to mount a new tire on the wheel K all that is necessary is to unscrew the pressure nut E, remove the cross bar F and reverse the position of the wheel K on the pedestal A turning the convex side of the wheel upwards; now place the new tire loosely in its position on the rim of the wheel K; place the cross bar F in position again with its pressure shoes G G bearing upon the new tire; put the pressure nut E in place and turn the latter down with a wrench until the new tire is forced into position on the rim; the lock ring may now be adjusted and the pressure nut loosened up. It will be readily apparent that the construction and operation of this device is simplicity in itself but one advantage that may not be so apparent is that the pedestal may be tipped over into a horizontal position by a slight pull upon the stud C; in this horizontal position any heavy wheel may be easily threaded on the stud C and then the pedestal restored to the upright position, this process being facilitated by the weighting of the base B. Thus it will be seen that in using this machine it is never necessary for an operator to lift the heavy wheels either on to or off the pedestal but simply to tilt the pedestal to a horizontal position for purposes of either loading or unloading wheels.

The drawings illustrate a simple form of making the device but I realize that various forms may be adopted and in fact I have at present in use various other forms one of which is an adjustable cross bar F having the shoes G G adjustable to suit different diameters of wheels and tires.

Having thus fully described and illustrated the construction and operation of my device what I claim and wish to protect by Letters Patent is as follows:—

A wheel tire press consisting of a stand of suitable dimensions and material, weighted at the base but tiltable from a vertical to a horizontal position by hand pressure; a threaded bolt extending from said stand; a pressure nut adapted to travel on said bolt and a means for transmitting the pressure from said travelling pressure nut to a wheel tire substantially as shown.

JOHN McKENZIE.